United States Patent
Hollander et al.

(10) Patent No.: US 9,008,288 B2
(45) Date of Patent: Apr. 14, 2015

(54) SYSTEM AND METHOD FOR SUPPORTING SELF SERVICE AND ASSOCIATED AGENT-ASSISTED SERVICE CALL ROUTING

(71) Applicant: Jacada Inc., Atlanta, GA (US)

(72) Inventors: Gideon Hollander, Hod Ha'Sharon (IL); Dany Weil, Tel Aviv (IL); Opher Richter, Hod Ha'Sharon (IL)

(73) Assignee: Jacada Inc., Atlanta, GA (US)

( * ) Notice: Subject to any disclaimer, the term of this patent is extended or adjusted under 35 U.S.C. 154(b) by 137 days.

(21) Appl. No.: 13/850,595

(22) Filed: Mar. 26, 2013

(65) Prior Publication Data

US 2013/0251126 A1    Sep. 26, 2013

Related U.S. Application Data

(60) Provisional application No. 61/615,822, filed on Mar. 26, 2012, provisional application No. 61/714,259, filed on Oct. 16, 2012.

(51) Int. Cl.
*H04M 3/51* (2006.01)
*H04M 7/00* (2006.01)

(52) U.S. Cl.
CPC .......... *H04M 3/5183* (2013.01); *H04M 3/5166* (2013.01); *H04M 7/003* (2013.01); *H04M 2201/42* (2013.01); *H04M 2203/254* (2013.01); *H04M 2203/355* (2013.01); *H04M 2203/551* (2013.01)

(58) Field of Classification Search
CPC . H04M 3/5183; H04M 3/5166; H04M 7/003; H04M 2203/551; H04M 2203/254; H04M 2203/355; H04M 2201/42

USPC .......... 379/93.17, 88.13, 88.17, 265.09, 379/265.11, 265.01, 265.02, 265.05; 707/916, 956, 999.01, 999.104; 348/14.01–14.03
See application file for complete search history.

(56) References Cited

U.S. PATENT DOCUMENTS

| | | | |
|---|---|---|---|
| 5,802,526 A * | 9/1998 | Fawcett et al. ............. | 379/88.13 |
| 8,054,952 B1 | 11/2011 | Or-Bach et al. | |
| 2007/0265873 A1 | 11/2007 | Sheth et al. | |

(Continued)

OTHER PUBLICATIONS

Lisa Hoover, "Fonolo Skips Automated Customer Service Phone Trees, Now on iPhone", http://lifehacker.com/5470697/fonolo-skips-automated-customer-service-..., pp. 1-2.

(Continued)

*Primary Examiner* — Melur Ramakrishnaiah
(74) *Attorney, Agent, or Firm* — Volentine & Whitt, PLLC

(57) ABSTRACT

A method and system support an interaction of a user with a self service application via a self service access terminal, which may be a mobile device. The user employs the self service access terminal to navigate a decision tree associated with the self service application. When the user reaches a point in the decision tree which indicates that an agent-assisted service session should be initiated between the user and a human agent, the voice call may be initiated and data associated with the interaction with the self service application is communicated to an agent computer which displays the data to the human agent who handles the voice call. The data may include user data, environmental data, line-of-business data pertaining to the user, and/or data indicating the path on the decision tree which the user traversed prior to the voice call.

23 Claims, 13 Drawing Sheets

(56) References Cited

U.S. PATENT DOCUMENTS

| | | |
|---|---|---|
| 2009/0154671 A1 | 6/2009 | Weiss et al. |
| 2009/0248420 A1 | 10/2009 | Basir et al. |
| 2010/0190477 A1 | 7/2010 | Williams et al. |
| 2010/0226489 A1* | 9/2010 | Sarkar et al. ............. 379/265.09 |
| 2010/0241664 A1 | 9/2010 | LeVasseur et al. |
| 2011/0019812 A1 | 1/2011 | Sankaranarayanan |
| 2011/0047221 A1 | 2/2011 | Watanabe et al. |
| 2011/0103559 A1 | 5/2011 | Andrews et al. |
| 2011/0293077 A1 | 12/2011 | Dubut et al. |
| 2012/0008755 A1 | 1/2012 | Mittal |
| 2012/0022938 A1 | 1/2012 | McNea et al. |
| 2012/0044932 A1 | 2/2012 | Sidhu et al. |
| 2012/0069976 A1 | 3/2012 | Tischer et al. |
| 2012/0129514 A1 | 5/2012 | Beenau et al. |
| 2012/0190333 A1 | 7/2012 | Portman et al. |
| 2012/0214516 A1 | 8/2012 | Rosenberg |
| 2012/0237009 A1 | 9/2012 | Szpilfogel |
| 2012/0260194 A1 | 10/2012 | Kennedy et al. |
| 2012/0265694 A1 | 10/2012 | Tuchman et al. |
| 2012/0265695 A1 | 10/2012 | Tuchman et al. |
| 2012/0265696 A1 | 10/2012 | Tuchman et al. |
| 2012/0265697 A1 | 10/2012 | Tuchman et al. |
| 2012/0265800 A1 | 10/2012 | Tuchman et al. |
| 2012/0266258 A1 | 10/2012 | Tuchman et al. |
| 2012/0309351 A1 | 12/2012 | Dutta |
| 2012/0320903 A1 | 12/2012 | Ilagan |
| 2013/0003957 A1 | 1/2013 | Singh et al. |
| 2013/0038519 A1* | 2/2013 | Bi et al. ........................ 345/156 |

OTHER PUBLICATIONS

"Groupama releases the << Groupama toujours là >> iPhone application", Jan. 3, 2011, http://www.sqli.com/eng/news/Press-releases/Groupama-releases-the-Gr..., pp. 1-2.

* cited by examiner

SYSTEM AND METHOD FOR SUPPORTING SELF SERVICE AND ASSOCIATED AGENT-ASSISTED SERVICE CALL ROUTING

CROSS-REFERENCES TO RELATED APPLICATIONS

This patent application claims priority under 35 U.S.C. §119 (e) from U.S. provisional patent application 61/615,822, filed on 26 Mar. 2012, and also from U.S. provisional patent application 61/714,259, filed on 16 Oct. 2012, the entire disclosure of each of which provisional applications is incorporated herein by reference.

BACKGROUND AND SUMMARY

This invention pertains to the field of self-service processes, systems, and applications. More particularly, the present invention is directed to a system and method for self service, call routing, and intelligent transition from self service to agent-assisted service.

Automated telephone-based customer support systems, such as auto attendant (AA) systems, (which may also be referred to as automated attendant systems, virtual receptionist systems, interactive voice response (IVR) systems, AA/IVR systems, and other names) have evolved from relatively simple devices to more complex computerized systems for handling calls pertaining to a variety of issues. Modern AA systems can often allow a caller to resolve an issue through self service, without the need for a human agent to provide agent-assisted service. And in cases where agent-assisted service is required to address a caller's issue, an AA system may facilitate connecting the caller to the appropriate agent for resolving the issue.

For example, an AA system may automatically answer a telephone call from a caller, play a standard message to the caller, and then await a response from the caller. In some AA systems, this response may come in the form of the caller depressing a particular telephone key, which often generates a standardized set of tones called Dual-tone multi-frequency tones (DTMF), and/or in the form of voice input for more sophisticated voice recognition systems. Based on the caller response, the system may process the incoming call appropriately to resolve one or more issues which prompted the caller to place the call.

Auto attendant systems often have a complex menu structure, via which an incoming caller may, for example, proceed through a complex decision tree, being presented with a series of recorded voice prompts (or generated voice prompts utilizing Text-To-Speech) and providing corresponding responses, in order to connect the incoming caller with a particular person, departmental function, or information to resolve the incoming caller's issue(s). Some AA systems operate using voice communication over traditional Public Switched Telephone Networks (PSTN), wireless radio infrastructure, and/or voice-over-IP technologies.

Many commercial owners or users of AA systems also operate websites which can provide additional information to a customer, and in this case, one or more voice prompts which are provided by the auto attendant system may encourage incoming callers to stop using the telephone-based AA system, and instead to switch to using a web browser to engage in a self service operation with a computer-based customer support system.

However, callers to an organization's telephone-based auto attendant system may experience frustration with unsuccessful IVR interactions or encounter long wait times during peak call periods. Computer-based customer support systems may provide (e.g., via a network) a broader range of automated information and with little or no wait times where a customer seeks a resolution to the customer's issue during a self service session. However, if the computer-based customer support system fails to allow the customer to resolve an issue, the customer may still need to speak with a customer service agent to resolve the issue.

Accordingly, it would be advantageous to provide a system and method which supports self service, and which can facilitate and streamline the operation of a subsequent telephone call for agent-assisted service.

The present invention comprises a system and method for supporting self service, and for subsequent call routing for agent-assisted service when self service does not resolve an issue.

In one aspect of the invention, a method is provided of supporting an interaction of a user with a self service application. The method comprises: (1) presenting to the user, via a display device of a self service access terminal, a user interface for the self service application; (2) receiving, via the user interface, a user-supplied input; (3) based at least in part on the user-supplied input, navigating a decision tree associated with the self service application to reach a next node of the decision tree, and presenting to the user a user interface screen which is associated with the next node; (4) repeating steps (2) and (3) until the next node of the decision tree indicates that an agent-assisted service session should be initiated between the user and a human agent; and (5) when the next node of the decision tree indicates that an agent-assisted service session should be initiated between the user and a human agent, communicating data associated with the interaction with the self service application to an agent computer which displays information to the human agent In another aspect of the invention, another method is provided of supporting an interaction of a user with a self service application. The method comprises: (1) at a server, receiving user-supplied input from a self-service access terminal which is located remotely from the server; (2) based at least in part on the user-supplied input, navigating a decision tree associated with a self service application to reach a next node of the decision tree; (3) communicating self service data from the server to the remotely located self-service access terminal, where the self service data is associated with the next node and causes the self-service access terminal to display on a display device a user interface screen associated with the next node; (4) repeating steps (1) through (3) until the next node of the decision tree indicates that an agent-assisted service session should be initiated between the user and a human agent; and (5) when the next node of the decision tree indicates that an agent-assisted service session should be initiated between the user and a human agent, communicating data associated with the interaction with the self service application from the server to an agent computer which displays information to the human agent.

In yet another aspect of the invention, a non-transitory data storage medium has stored thereon instructions for causing a processor to execute a process for supporting an interaction of a user with a self service application. The process comprises: (1) presenting to a user, via a display device of a self service access terminal, a user interface screen of a user interface of a self service application; (2) receiving, via the user interface, a user-supplied input pertaining to an interaction with the self service application; (3) based at least in part on the user-supplied input, navigating a decision tree associated with the self service application to reach a next node of the decision tree, and presenting to the user another user interface screen associated with the next node; and (4) repeating steps (2) and (3) until the next node of the decision tree indicates that an agent-assisted service session should be initiated between the user and a human agent; and (5) when the next node of the decision tree indicates that an agent-assisted service session should be initiated between the user and a human agent, automatically communicating data associated with the interaction with the self service application to an agent computer which displays information to the human agent.

DETAILED DESCRIPTION

In the description to follow an individual may be referred to as a "user," a "caller, or a "customer." It should be understand that these terms are used interchangeably, depending on context, to refer to an individual who has an issue which they wish to resolve. The issue may pertain to a technical problem that the individual is experiencing with a product or service provided by a company or organization, a need for information about a company or organization and/or its products or services, a billing problem, or any of a variety of other issues for which an individual may seek assistance through an AA system, and/or via an interaction with a self service application, and/or via agent-assisted support.

Figure 1A:
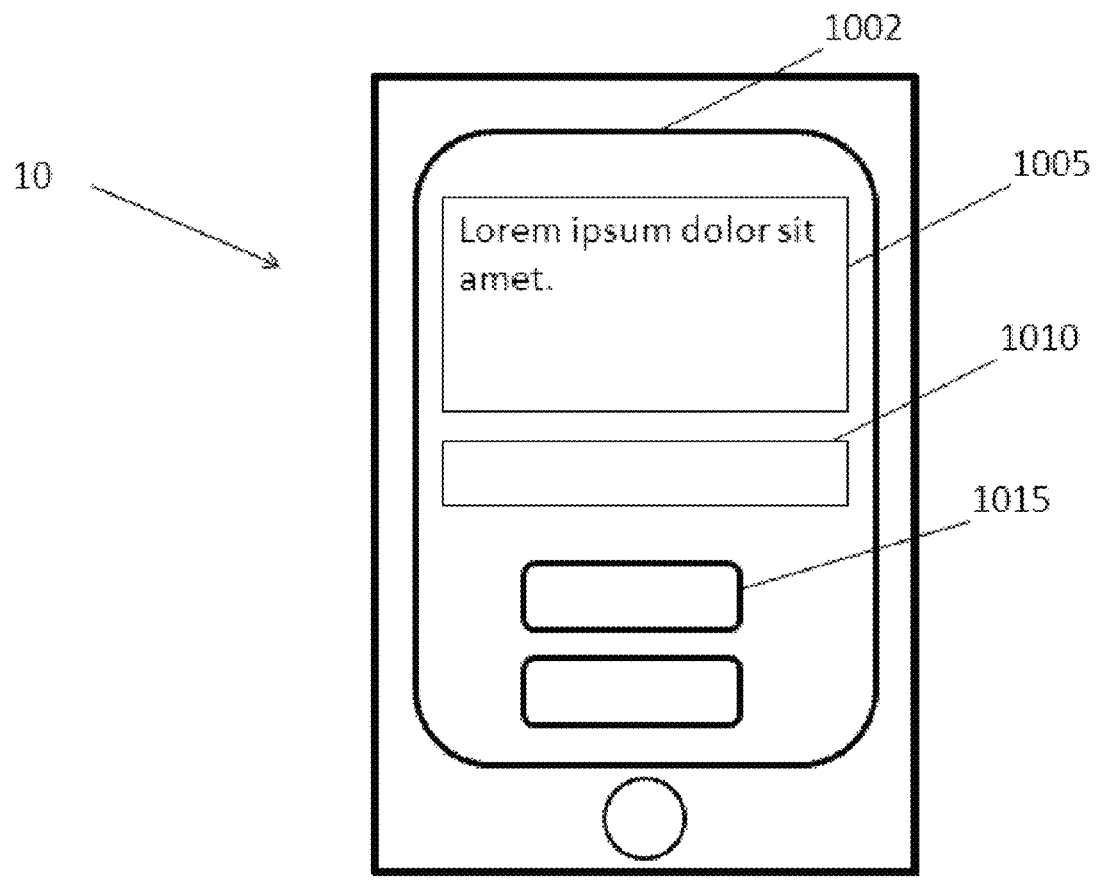
FIG. 1A illustrates one embodiment of a self service access terminal for a user to interact with a self service operation.

FIG. 1A illustrates one embodiment of a self service access terminal 10 for a user to interact with a self service operation. In this embodiment, self service access terminal 10 comprises a "smart phone" or a tablet or pad computing device. In other embodiments, self service access terminal 10 may comprise any other type of mobile device capable of running programs and communicating over a HTTP or TCP/IP connection.

Self service access terminal 10 includes a display device, a processor, memory, and one or more user input devices, which may include a touch screen, a keypad, a microphone, a keyboard, a trackball, a mouse, and/or any other known input device. The memory may comprise a non-transitory data storage medium and may have stored thereon instructions for causing the processor to execute a process for supporting an interaction of a user with a self service application, as described in greater detail below.

In some embodiments, self service access terminal 10 may include an antenna, a transmitter, and a receiver for communicating over a wireless network. In some embodiments self service access terminal may be capable of voice calls and/or data communication over a wireless network, for example a 3G or 4G network. In some embodiments, self service access terminal 10 may include a wireless local area network (WLAN) adaptor and antenna for communicating via a WLAN, such as an IEEE 802.11 network. In some embodiments, self service access terminal 10 may be able to establish an Internet connection via either a wireless network (e.g., a 3G or 4G network) and/or over a WLAN.

In more detail, FIG. 1A depicts a user interface and application with the ability to render or display various UI controls including, but not limited to, text areas 1005, input fields 1010 and virtual buttons 1015. Other embodiments may include the ability to render commonly accepted UI elements, including but not limited to listboxes, combo-boxes, multi-select, scrollable lists and so forth.

In operation, still referring to FIG. 1A, a user may navigate through a series of user interface screens (UI screens) 1002 which are displayed on a display device of self service access terminal 10, selecting various controls available via the various UI screens 1002 in order to resolve a specific issue, i.e., perform a "self-service interaction" with a self service application which may reside in whole or in part in one or more memory devices of self service access terminal 10 and/or a remotely located self service server (which will be described in greater detail below). UI screens 1002 are updated in response to user input received via UI screens 1002 until such time that user's issue has been resolved or until such time that the user chooses to communicate with a contact center agent for agent-assisted service to resolve the user's issue. In some embodiments, by the series of actions of presenting a UI screen 1002 to a user, receiving user input in response to the UI screen, and presenting a new UI screen 1002 in response to the user input, a user may traverse through nodes of a decision tree or call tree of a self service application with which the user interacts, where each node has associated therewith a corresponding UI screen 1002. Here it should be noted that a decision tree is a logical construct rather than a physical entity, and represents an abstraction of a complex algorithm which includes a plurality of optional paths which may be followed by a user while engaged in a self service session to resolve an issue. In some embodiments, data representing such a decision tree (e.g., metadata) may be stored locally in memory of self service access terminal 10, while in other embodiments, self service access terminal 10 may execute a client-server session with a remotely located self service server, where the data representing the decision tree is stored in a database, and which communicates data for the UI screen associated with each node of the decision tree to self service access terminal 10.

Still referring to FIG. 1A, buttons 1015 may exist on UI screen 1002 to allow a user at any time during the interaction with the self service application to request an agent-assisted service session to resolve the user's issue. The agent-assisted service session may take place via a voice call, or via a web chat with an agent at a call center. Additionally, in some embodiments a button 1015 may allow the user to request a call back from the call center agent. Here, a "Call" refers to establishing a voice connection to a call center agent, either via regular "phone" channel (e.g., the public switched telephone network (PSTN)) if self service access terminal 10 includes the capability for such phone calls, or via a voice-over-Internet-protocol (VoIP) client installed and running on self service access terminal 10. In some embodiments, buttons 1015 allowing the user to place a call to an agent may additionally display the expected hold time that user would experience if calling or web chatting with an agent at the contact center.

Figure 1B:
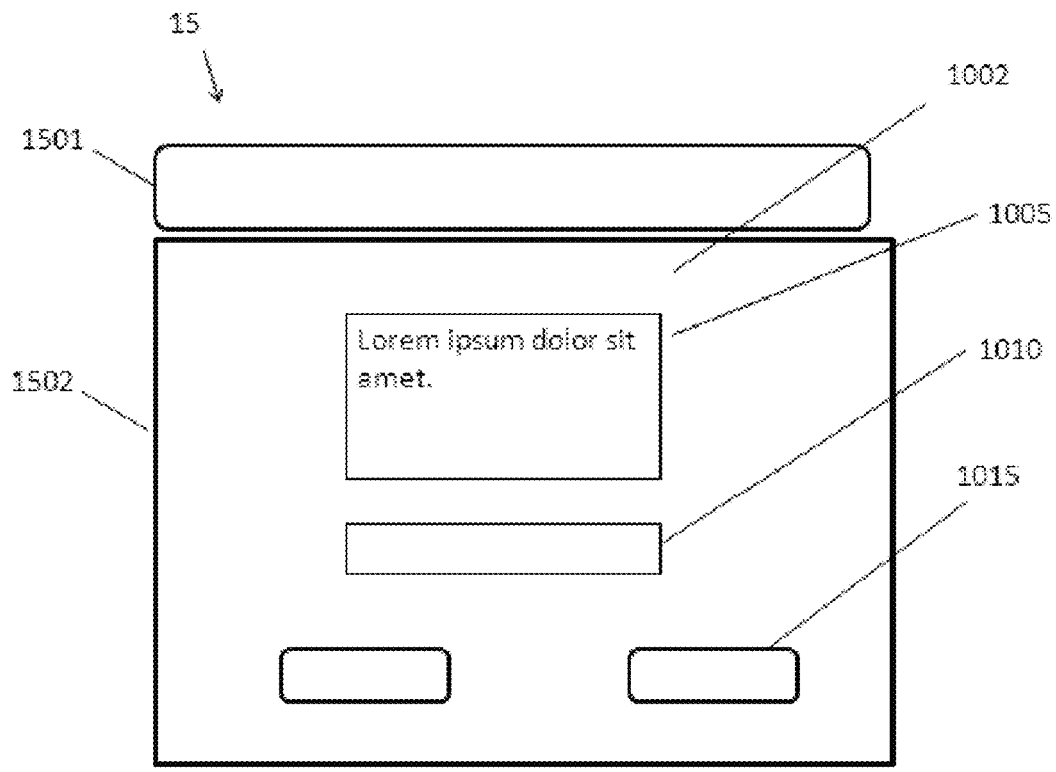
FIG. 1B illustrates another embodiment of a self service access terminal for a user to interact with a self service operation.

In some embodiments, when self service access terminal 10 is executing the self service application in a standalone mode and does not presently have access to a communication channel for an HTTP or TCP/IP communication session (e.g., not presently able to access the Internet), then the user may initiate a call to the call center agent via a separate telephone device. In that case, UI screen 1002 may notify a user of a unique ID assigned to the user's current interaction with the self service application, and an AA system to which the user connects via the separate telephone device FIG. 1B illustrates another embodiment of a self service access terminal 15 for a user to interact with a self service operation. Self service access terminal 15 may include, but is not limited to, a set-top box 1501 connected to a display device 1502 such as a television display. Self service access terminal 15 includes a processor and memory. Here, it is understood that set-top box 1501 is capable of rendering a user interface via a connected display device 1502. Alternate embodiments may include, but is not limited to: kiosks, point of sale terminals, ATM's, etc.

In some embodiments, self service access terminal 10 or 15 may have associated therewith a variety of sensors and/or data gathering devices, such as a global positioning system (GPS) receiver, a camera, a card swipe or near field readers, and/or other sensors.

In the description to follow, detailed examples and descriptions will be provided in the context of a user employing self service access terminal 10, in particular a smart phone. However, as noted above, it should be understood that a variety of other devices or platforms may be employed for the self service access terminal, without loss of generality.

Figure 2:
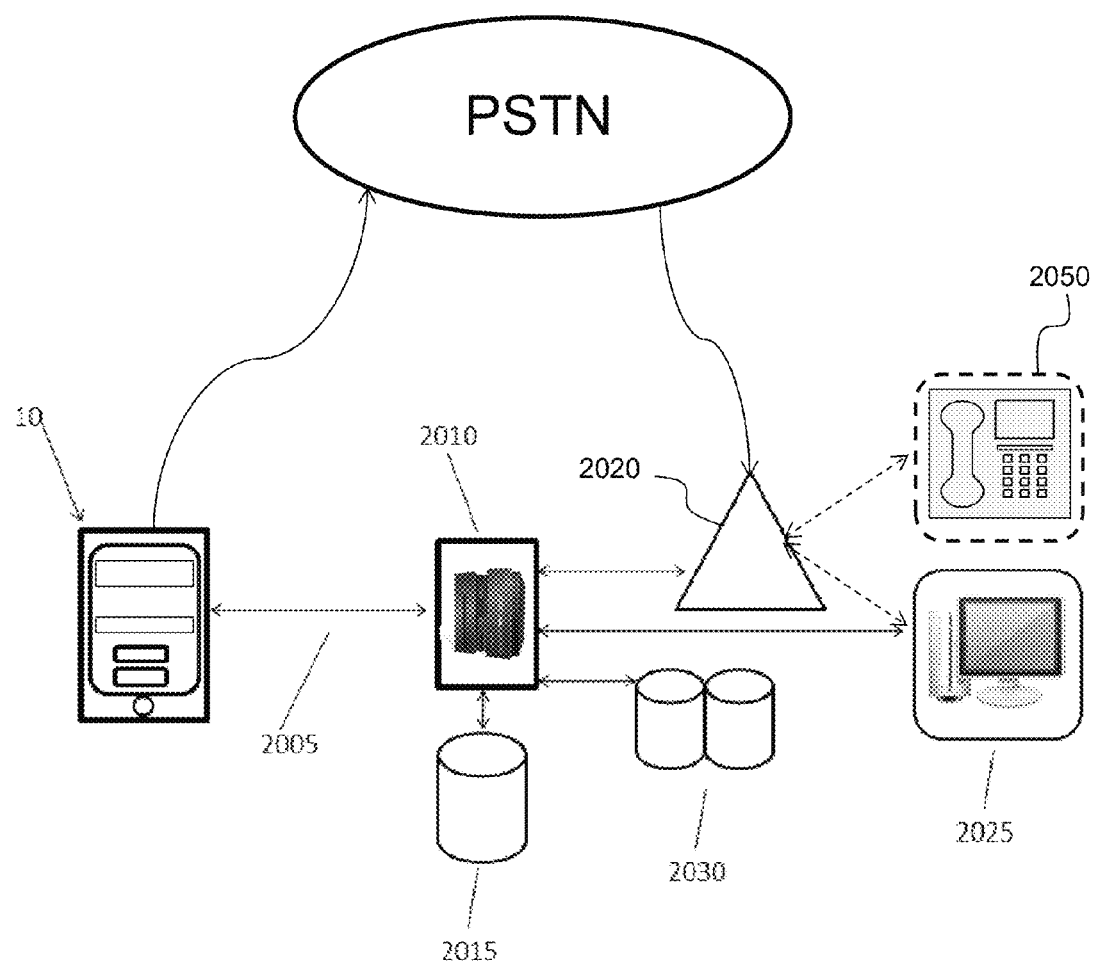
FIG. 2 illustrates an embodiment of a system for supporting self service, and for subsequent call routing for agent-assisted service.

FIG. 2 illustrates an embodiment of a system 20 for supporting self service, and for subsequent call routing for agent-assisted service. System 20 includes self service access terminal 10, self service application server 2010, a self service application database 2015, a computer telephony integration (CTI) server 2020, agent computer 2025, line of business (LOB) application(s) 2030, and optionally an agent telephone 2050. Self service application server 2010 includes a processor and memory. In some embodiments, the memory comprises a tangible, non-transitory, data storage medium and may have stored thereon instructions for causing the processor to execute a process for supporting an interaction of a user with a self service application, as described in greater detail below. In some embodiments, self service application server 2010 may include a network adaptor or interface for allowing self service application server 2010 to communicate via the Internet.

Referring now to FIG. 2, there is shown a mobile device as one possible embodiment of self service access terminal 10 by means of which the user conducts an interaction with a self-service application. The self-service application executing on self service access terminal 10 retrieves the next step in the self-service process from self service application server 2010 utilizing either an HTTP or TCP/IP connection 2005 (e.g., via the Internet). HTTP connections are by definition stateless and one or more embodiments of the invention support stateless and stateful operations based on the underlying protocol. Self service application server 2010 receives requests from self service access terminal 10, processes logic, retrieves data for the next node of a decision tree or call tree from self service application database 2015, and returns data associated with the next node to self service access terminal 10.

In an alternate embodiment, the self-service application resides on self service access terminal 10 which is able to cache the interaction steps, minimizing round-trips communications with self service application server 2010. In such a cached deployment, a user may be able to navigate through the entire self service session, or a subset of such session, without communication back to self service application server 2010, allowing for operation in a disconnected or "offline" mode wherein self service access terminal 10 is not in communication from the self service application server 2010 and indeed may performs the steps of navigating the decision tree for a self service session without any communication with any external device. In that case, self service access terminal 10 may store in a memory device thereof metadata for a processor of self service access terminal 10 to present the self service application to user as series of UI screens 1002.

In some embodiments, self service application server 2010 can optionally interact with and integrate with Line of Business ("LOB") applications 2030 to retrieve relevant customer or supporting information, including but not limited to customer information pertaining to customer information systems, billing data pertaining to billing systems, and knowledgebases. Data from LOB application(s) 2030 can affect logic flow in self service application server 2010 and return the results (or interpretation of the results) back to self service access terminal 10. Data from LOB application(s) 2030 may also be proactively pushed by self service application server 2010 to self service access terminal 10 without requiring the user to have initiated the request.

In some embodiments, self service application server 2010 can optionally interact with CTI server 2020 in order to initiate a call/voice/chat session with an agent (depicted in further detail in FIG. 11) or to determine current hold times or to initiate a call-back request. CTI server 2020 may be supplied by various vendors.

In some embodiments, self service application server 2010 can interface to and integrate with the applications running on the agent computer 2025 to communicate to agent computer 2025 data associated with a user's interaction with the self service application. Examples of such integration to agent computer 2025 may include, but are not limited to: providing a "screen-pop" of incoming caller information to an agent using once the user of self service access terminal 10 requests to place a voice call to the contact center; providing a detailed history of the sequences performed by user on self service access terminal 10 and the self-service interaction including the pages generated by self service application server 2010, and data retrieved from LOB applications 2030. In some embodiments, the agent is able to see on agent computer 2025 a full "call path" or interaction history or "Call Navigation Path" performed by the user of self service access terminal 10 prior to (or simultaneously with) establishing the voice connection.

In some embodiments, whenever a user initiates an interaction through system 20, the a unique ID ("Interaction ID") is assigned to the interaction, and the interaction state, context, data and steps performed are continually saved on self service application server 2010 and retrievable by this unique Interaction ID. The Interaction ID may be used to retrieve the details at a later time and may also be used to continue or "restart" an interaction at a later time by restoring the context, state and data entered previously.

Figure 3:
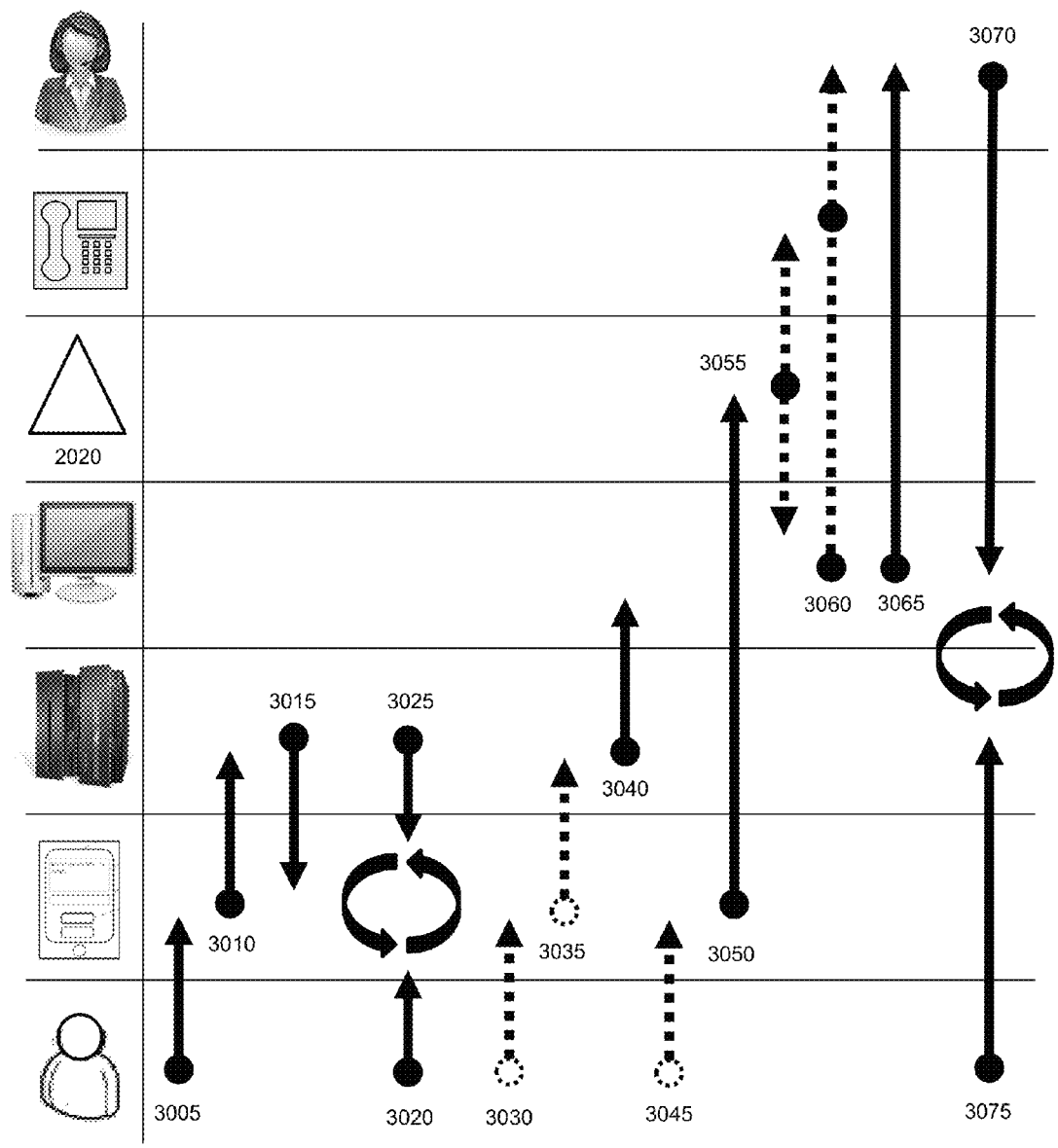
FIG. 3 illustrates a logical sequence flow for an example a self service interaction with one embodiment of a self service application followed by agent-assisted service.

FIG. 3 illustrates a logical sequence flow 30 for an example a self service interaction with one embodiment of a self service application followed by agent-assisted service.

An initial self service session may be initiated by a user starting or launching a self service application via self service access terminal, depicted in FIG. 3 by process 3005. In some embodiments, self service access terminal 10 establishes contact with self service application server 2010 and downloads data associated with a first page or UI screen 1002 of the self service application, depicted by processes 3010 and 3015. The first page or UI screen 1002 may be associated with a node (e.g., a starting node) of a decision tree (see FIG. 8) associated with the self service application. Self service application server 2010 may determine the best starting node for a particular interaction with the self service application based on any number of business rules, including, but not limited to, previous interaction data and results, data collected from LOB systems, current Contact Center agent availability, and/or the current state of self service access terminal 10.

Self service access terminal 10 may display the first UI screen 1002 on a display device (e.g., a touch screen) associated with self service access terminal 10. The user may interact with the self service application via self service access terminal 10 by selecting an appropriate option or button presented on the UI screen 1002, or otherwise by providing user-supplied input, as depicted in process 3020. In some embodiments, at all times during the process 3020 self service access terminal 10 may communicate to self service application server 2010 environmental data gathered from one or more sensors and/or data gathering devices associated with self service access terminal 10, such as GPS data, image data, a card swipe data, etc. User selection of an option via UI screen 1002 may initiate communication of the user-supplied input from self service access terminal 10 to self service application server 2010 where self service application server 2010 may store the user-supplied input in self service application database 2015, for example in a data file associated with a unique Interaction ID for this particular self service session. Furthermore, based at least in part on the user-supplied input, self service application server 2010 may navigate the decision tree to reach a next node of the decision tree. The next node may a UI screen 1002 associated therewith, and self service application server 2010 may communicate self service data associated with that UI screen 1002 back to self service access terminal 10, as depicted by process 3025. In some embodiments, at all times during the process 3025 the self service application server 2010 may have the ability to connect to LOB application(s) 2030 to retrieve data (e.g., customer data or business data) and communicate this data to self service access terminal 10. Processes 3020 and 3025 may repeat until the problem has been resolved (a completed self-service interaction) or until a node in the decision tree is reached which indicates that an agent-assisted service session should be initiated between the user and a human agent.

An endpoint in the decision tree may be reached by the user ending the self service session.

A node in the decision tree indicating that an agent-assisted service session should be initiated between the user and a human agent may be reached in various ways, including for example the receipt of user-supplied input via a UI screen 1002 whereby the user requests a call back or that the self service application initiate a call to an agent, or by the user placing a call to a call center agent, or by a "dead-end" in the decision tree where the designer of the self service application has determined that resolution of the problem will require an agent-assisted service session.

In some cases, the user may initiate an agent-assisted service session via a button of a UI screen 1002 of the self service application as displayed on the display device of self service access terminal 10, depicted in FIG. 3 by an optional process 3030. In that case, the user-supplied input initiating the agent-assisted service session may be communicated from self service access terminal 10 to self service application server 2010, depicted in FIG. 3 by an optional process 3035. In other cases, the design of the decision tree for self service application may include or more nodes where an agent-assisted service session is initiated automatically by the self service application. In some embodiments, when an agent-assisted service session is to be initiated, a user may be presented with an option, via a UI screen 1002, to place a call immediately, or to request a call back from an agent when the agent becomes available. In order to assist a user in making a decision as to whether to place a call or to request a call back from an agent, in some embodiments self service application server 2010 is able to integrate with CTI server 2020 to determine an approximate current wait or hold time based on the particular queue or agent group which is needed to resolve a particular issue.

Regardless of whether a user requests a call-back, whether a call is initiated by the user manually or automatically by the self service application, self service application server 2010 communicates data associated with the user's interaction with the self service application to agent computer 2025 which displays information to the human agent, depicted in FIG. 3 as a process 3040. The data may include user data, environmental data, and/or a detailed interaction data representing a history of the nodes of the decision tree which were traversed during the interaction of the user with the self service application. Further, in some embodiments, technology may allow automation of entering data received into applications running on agent desktop in order to reduce handling time by the agent 2025.

In some embodiments, to initiate an agent-assisted session, a call may be automatically placed from self service access terminal 10 to CTI server 2020. In other embodiments, a user may manually initiate the call via self service access terminal 10, depicted in FIG. 3 as an optional process 3045. In still other embodiments where self service access terminal 10 is not able to be connected to CTI server 2020, a user may place the call using a separate telephone. As explained above, the call may be conducted over a standard phone channel via the PSTN, or using VoIP.

Regardless of the method, a call connection is established between self service access terminal 10 and CTI server 2020, depicted in FIG. 3 as process 3050. CTI server 2020 routes the call to the agent telephone 2050 and/or agent computer 2025, depending on the nature of the call (PSTN, VoIP, etc.) and the CTI server 2020, as depicted in FIG. 3 as process 3055. The agent processes the call via agent telephone 2050 and/or agent computer 2025, depicted in FIG. 3 as process 3060. Also, via agent computer 2025 the agent accesses the data associated with the user's interaction with the self service application, including for example user data, environmental data, and/or a detailed interaction data representing a history of the nodes of the decision tree which were traversed during the interaction of the user with the self service application, depicted in FIG. 3 as process 3065. Finally, the agent and the user communicate with each other to resolve the user's issue, depicted in FIG. 3 as processes 3070 and 3075.

Figure 4:
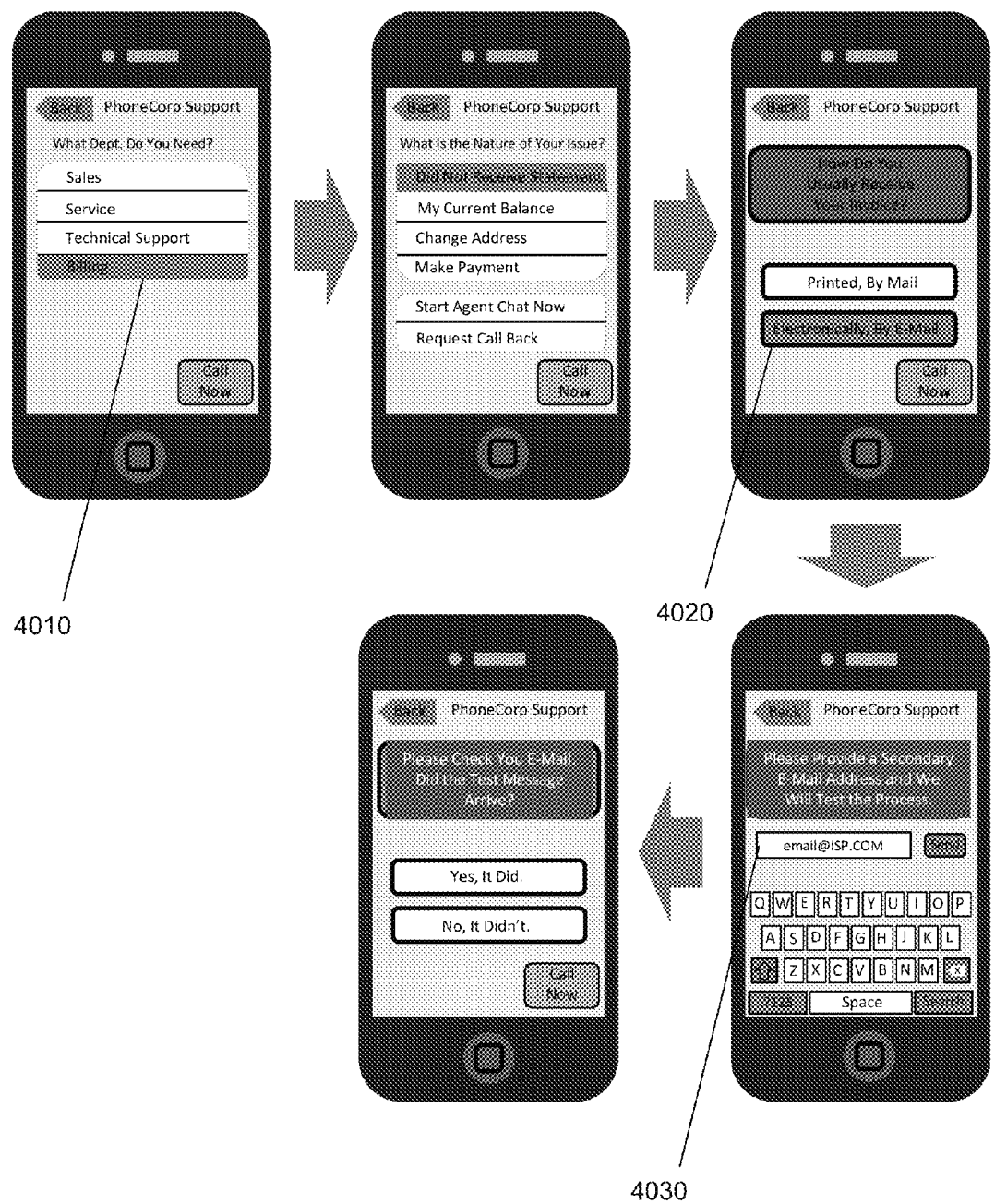
FIG. 4 depicts an example of an interaction with a self service application via a mobile device operating as a self service access terminal.

FIG. 4 depicts an example of an interaction 40 with a self service application via a mobile device operating as a self service access terminal.

In the example, a user may be prompted with choice lists to select the nature of the self service interaction 4010, choice buttons 4020, and user also has the ability to enter alphanumeric data 4030.

Figure 5:
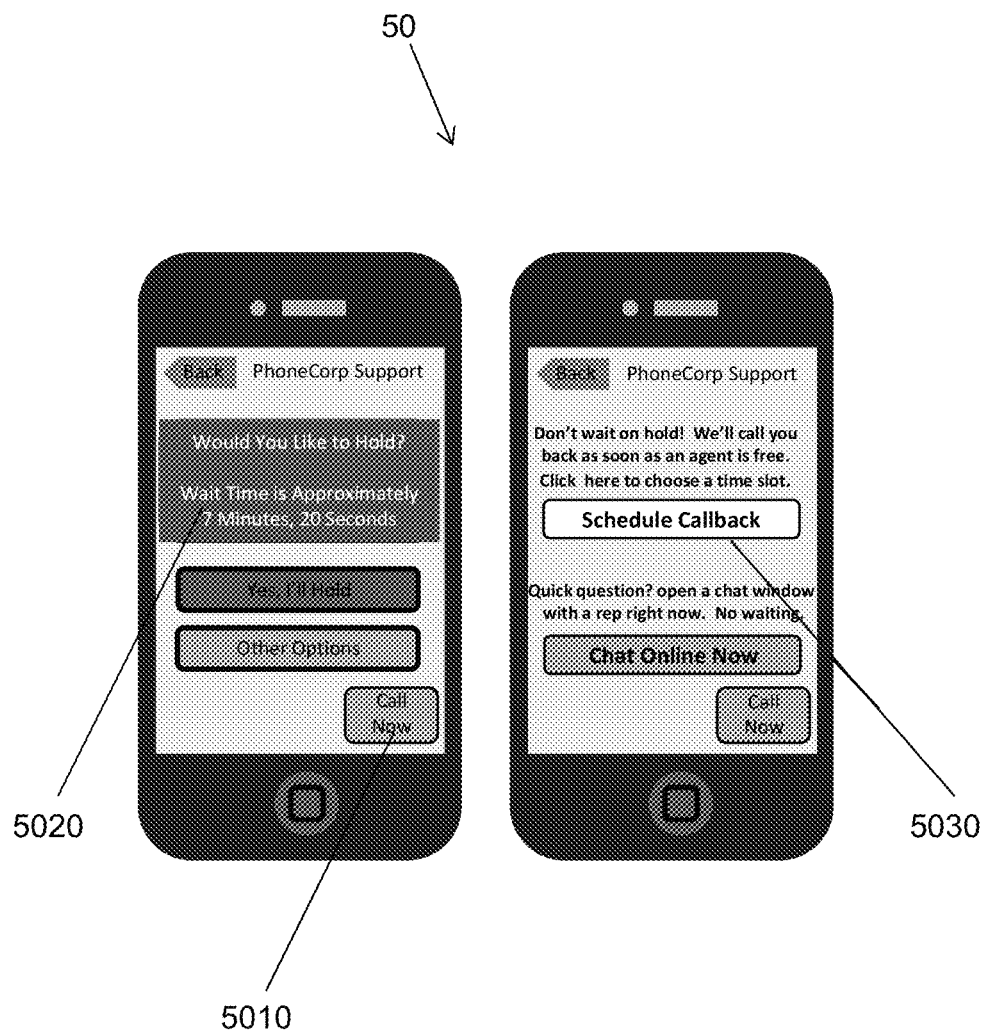
FIG. 5 depicts an example of an operation whereby a user of a mobile device operating as a self service access terminal may request a call-back or place a call and receive information about the waiting time.

FIG. 5 depicts an example of an operation 50 whereby a user of a mobile device operating as a self service access terminal 10 may request a call-back or place a call and receive information about the waiting time. The user may at any time select the Call Now option 5010 displayed on a display screen of self service access terminal 10 via a UI screen 1002. Prior to selecting Call Now option 5010, or after having already selected the Call Now option, the user can be informed of the current wait time and be asked if they would like to execute a Hold option 5020. Existing telephony infrastructure may be employed to determine hold times. Alternatively, the user may choose, because of long hold or wait times or, for other reasons, to request a call back and can select this option 5030. In that case, a scheduler may be provided to allow the user to request a convenient time slot for the call back, again, working in coordination with the existing telephony system for available times.

Figure 6:
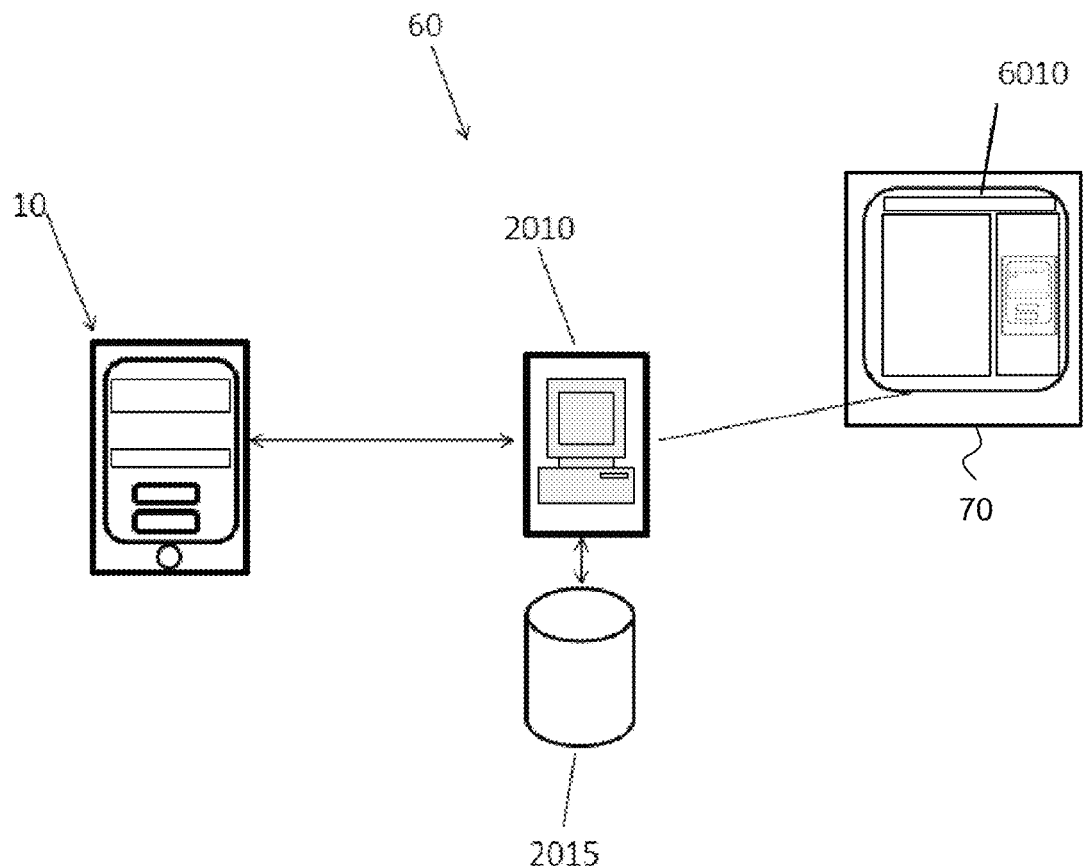
FIG. 6 depicts an example embodiment of a logical architecture for a designer application executing on a designer terminal to publish to a self service application server.

FIG. 6 depicts an embodiment of a logical architecture 60 for a designer application 6010 executing on a designer terminal 70 to publish a self service application to self service application server 2010. Designer 6010 may be provided as a graphical tool allowing call scripts to be created. These call scripts may be published to self service application server 2010 where they may be retrieved by self service access terminal 10 on each execution of the self service application and/or script, or alternatively to be cached within memory of self service access terminal 10 for standalone operation.

Figure 7:
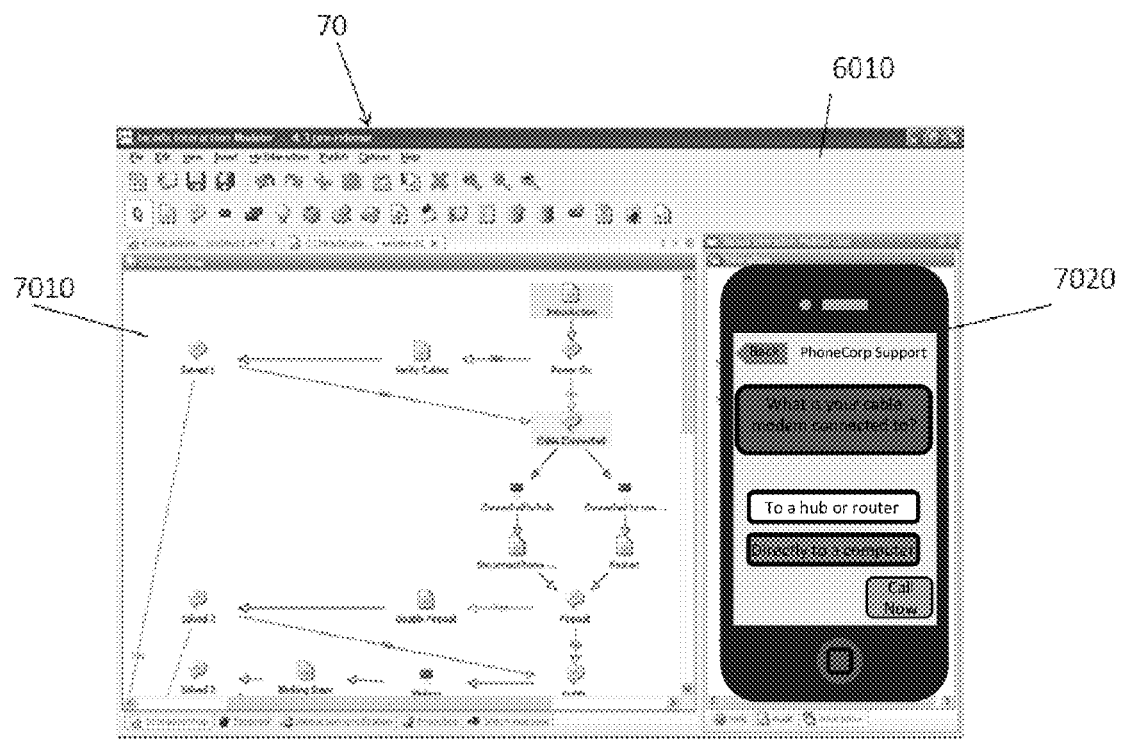
FIG. 7 depicts an example embodiment of a designer terminal executing an embodiment of a designer application for designing a self service application.

FIG. 7 depicts an example embodiment of a designer terminal 70 executing an example embodiment of a designer application 6010 for designing a self service application. In some embodiments, designer application allows a self service application to be created with a modular design comprising a plurality of separate modules ("call scripts") with defined boundaries which interconnect with each other to form a self service application Referring now to FIG. 7, there is shown an example of how designer 6010 may appear visually to an author of a self service application or a call script for the self service application. The design environment allows the author to drag and drop visual nodes depicting the call flow and the options emanating from each point in a decision tree on a canvas 7010. Furthermore, the author may see a preview of the self-service interaction in a Window 7020 in designer 6010, representing a self service access terminal 10. Call scripts and self service applications can be tested before deploying them to self service application server 2010.

Figure 8:
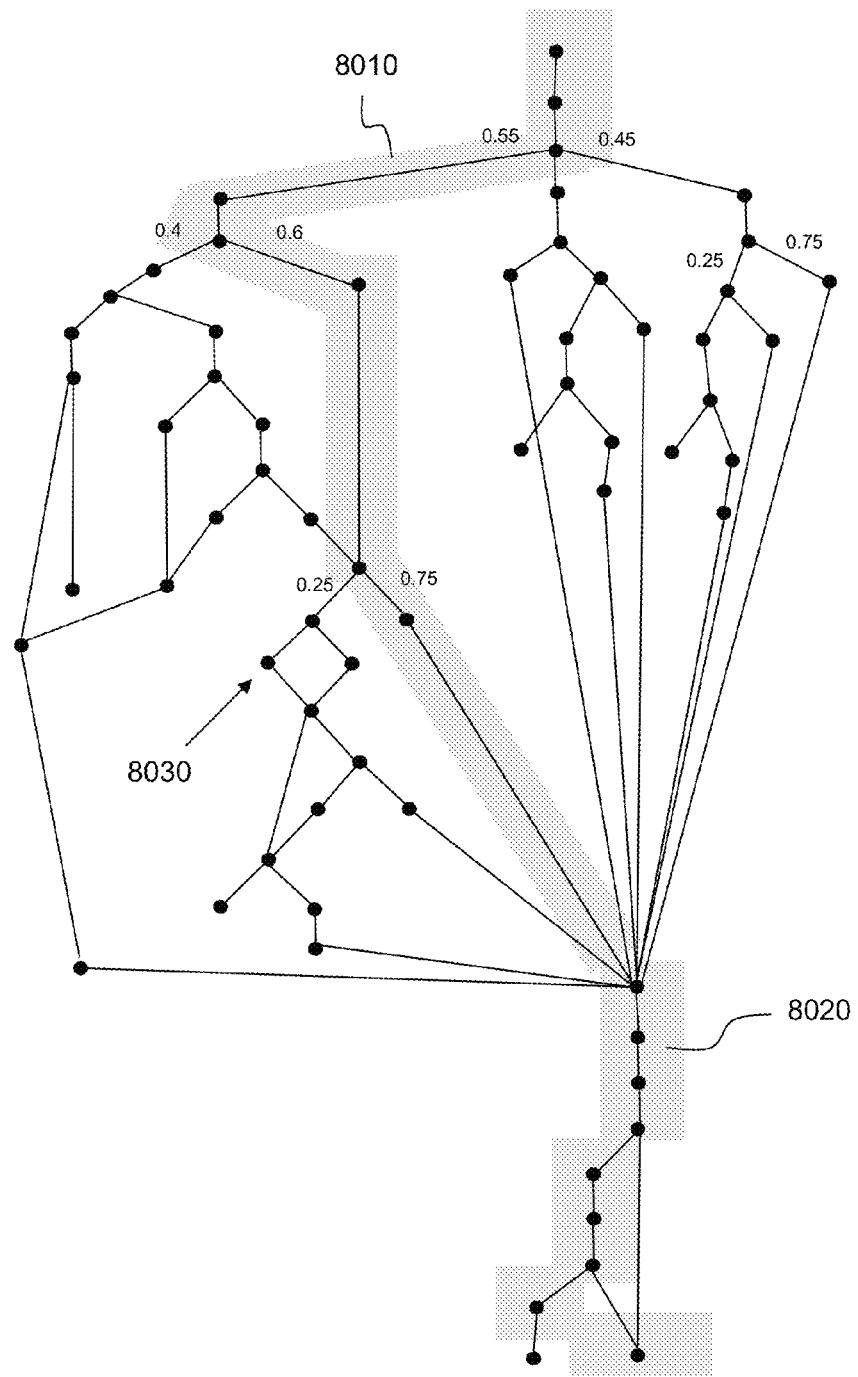
FIG. 8 depicts an example embodiment of a decision tree and some analytics for the decision tree that may be produced according to one embodiment.

FIG. 8 depicts an example embodiment of a decision tree or call tree 80 and some analytics for decision tree 80 which may be produced according to one embodiment. The analytics include, but are not limited to, the ability to see the path 8010 which most users traverse, the specific nodes 8020 in the call path that take the most time to complete, the points 8030 within the decision tree where most customers abandon the interaction with the self service application, the relative percentages for which each alternative path is followed from a parent node, etc. In some embodiments, data representing decision tree 80 (e.g., metadata) may be stored in memory of self service access terminal 10. In other embodiments, data representing decision tree 80 may be stored in self service application server 2010 or self service application database 2015 associated with self service application server 2010. In some embodiments, self service application server 2010 may maintain and calculate a detailed interaction history for all users, allowing an administrator or other operator to create reports and graphs that provide information that includes, but is not limited to: most frequently traversed paths and nodes, least frequently traversed paths and nodes, time spent at each node, drop-out rate at each node, etc.

Figure 9:
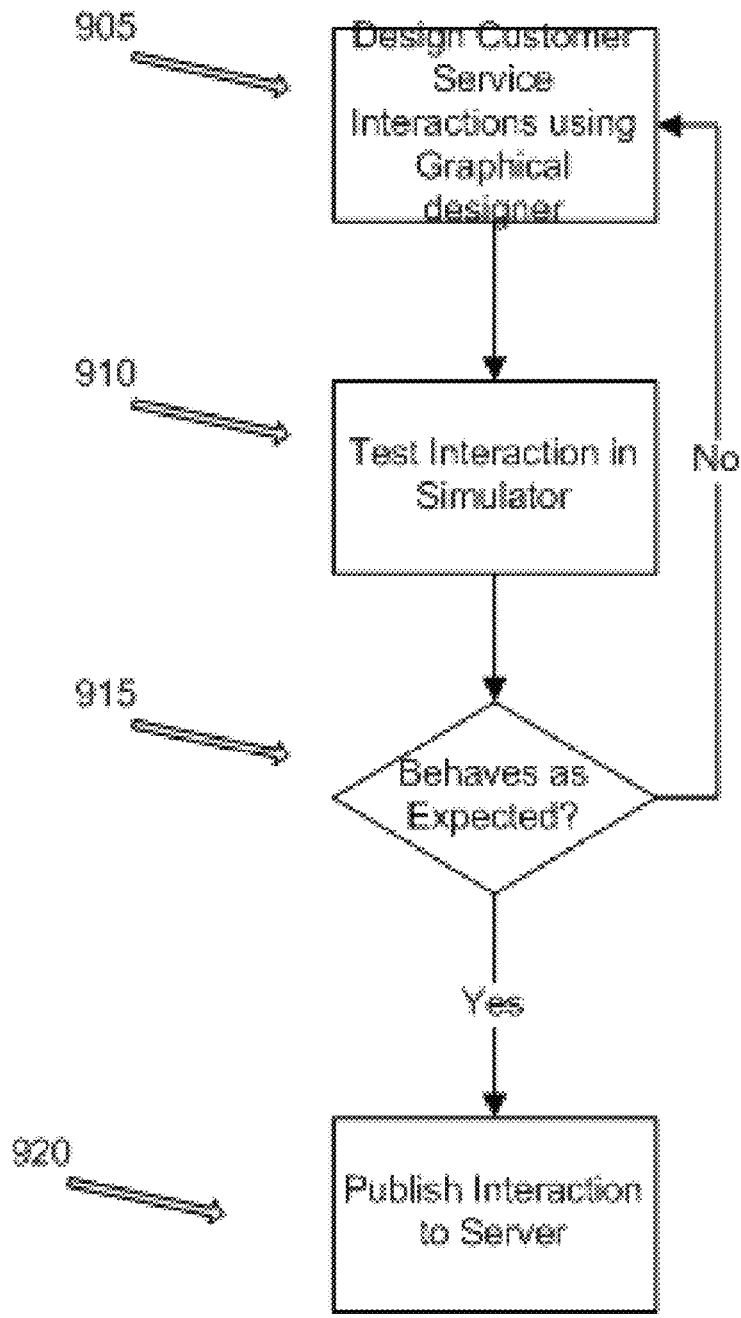
FIG. 9 is a flowchart depicting one embodiment of a method of creating a script for a self service application and publishing it to a self service application server.

FIG. 9 is a flowchart depicting one embodiment of a method 900 of creating a call script for a self service application and publishing it to a self service application server 2010. Here, it should be understood that the self service application may comprise several call scripts. A call script may be created in step 905 using graphical designer 6010, for example by dragging and dropping visual components on canvas 7010. The call script can be optionally tested 910 in a simulation mode before ever publishing it to self service application server 2010. If the call script is not behaving as expected 915 the author can make changes to the call script within designer 6010. If it is determined in a step 915 that the call script is behaving as expected, in a step 920 the author can select to publish this call script to the self service application server 2010 where it will remain in a Draft state waiting for approval before being made available to one or more self service access terminals 10. Publishing is described in further detail referencing FIG. 12.

Figure 10:
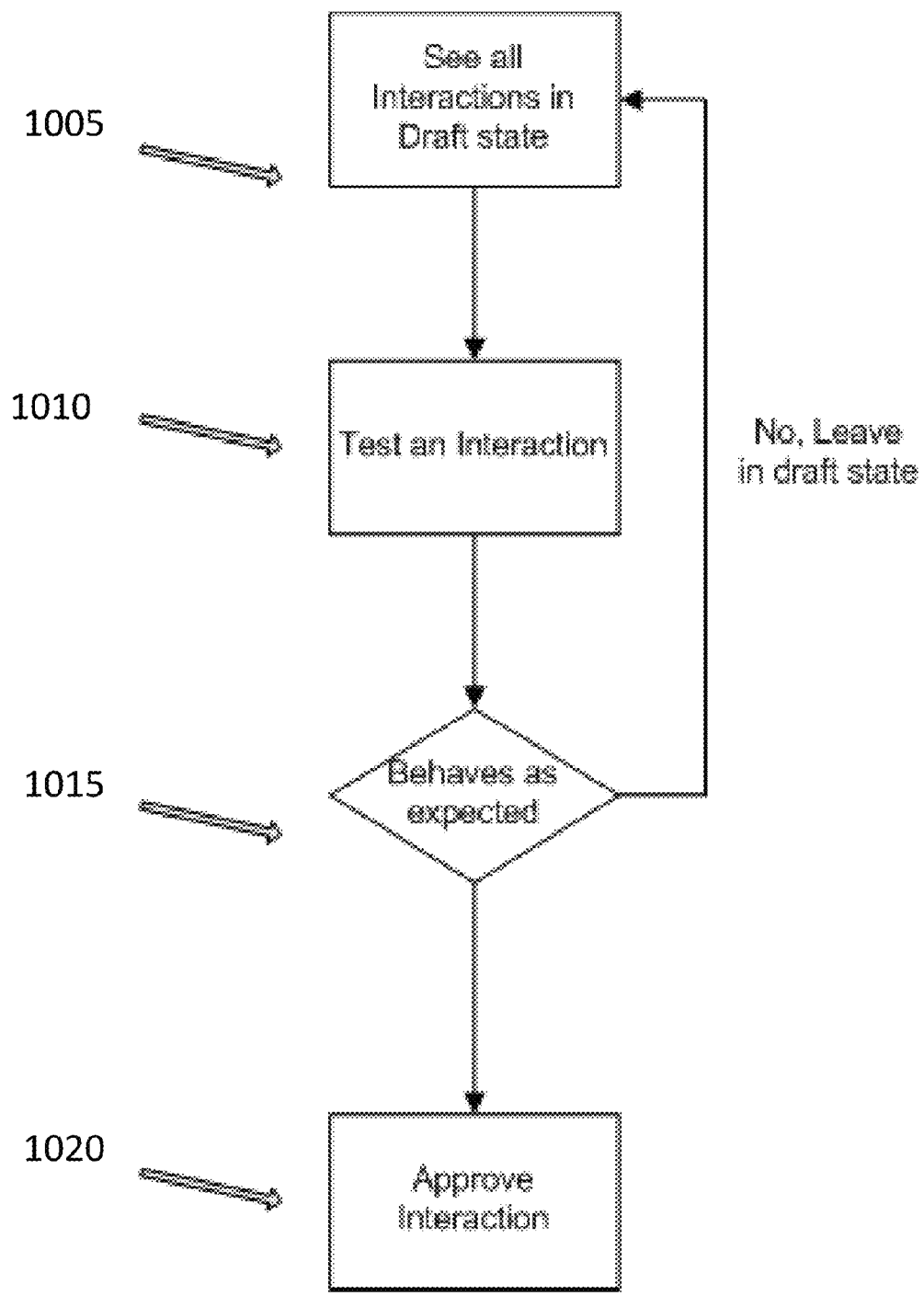
FIG. 10 is a flowchart depicting one embodiment of a method of approving a script for a self service application for deployment to one or more self service access terminal.

FIG. 10 is a flowchart depicting one embodiment of a method 1000 of approving a script for a self service application for deployment by self service application server 2010 to one or more self service access terminals 10. In a step 1005, a person (administrator) with the appropriate authorization and credentials may log into self service application server 2010 via an administration interface and see all of the call scripts which have been published from designer 6010, as described above with respect to FIG. 9. In a step 6010, the administrator may optionally test a call script directly within an administration interface to ensure that its behavior is as expected. If it is determined in a step 1015 that the behavior is not as expected, the call script will remain in draft state and not be made available to self service access terminal(s) 10. If the interaction behaves correctly, then in a step 1020 the administrator may mark the interaction as "Approved". In some embodiments, only approved call scripts are made available to a user of a self service access terminal 10. While this process depicts a simplistic workflow of advancing a call script from Draft to Approved, nothing herein should be construed to limit this to a two stage workflow. Multiple approval cycles and approval roles may be implemented to finally end up in an approval state.

Figure 11:
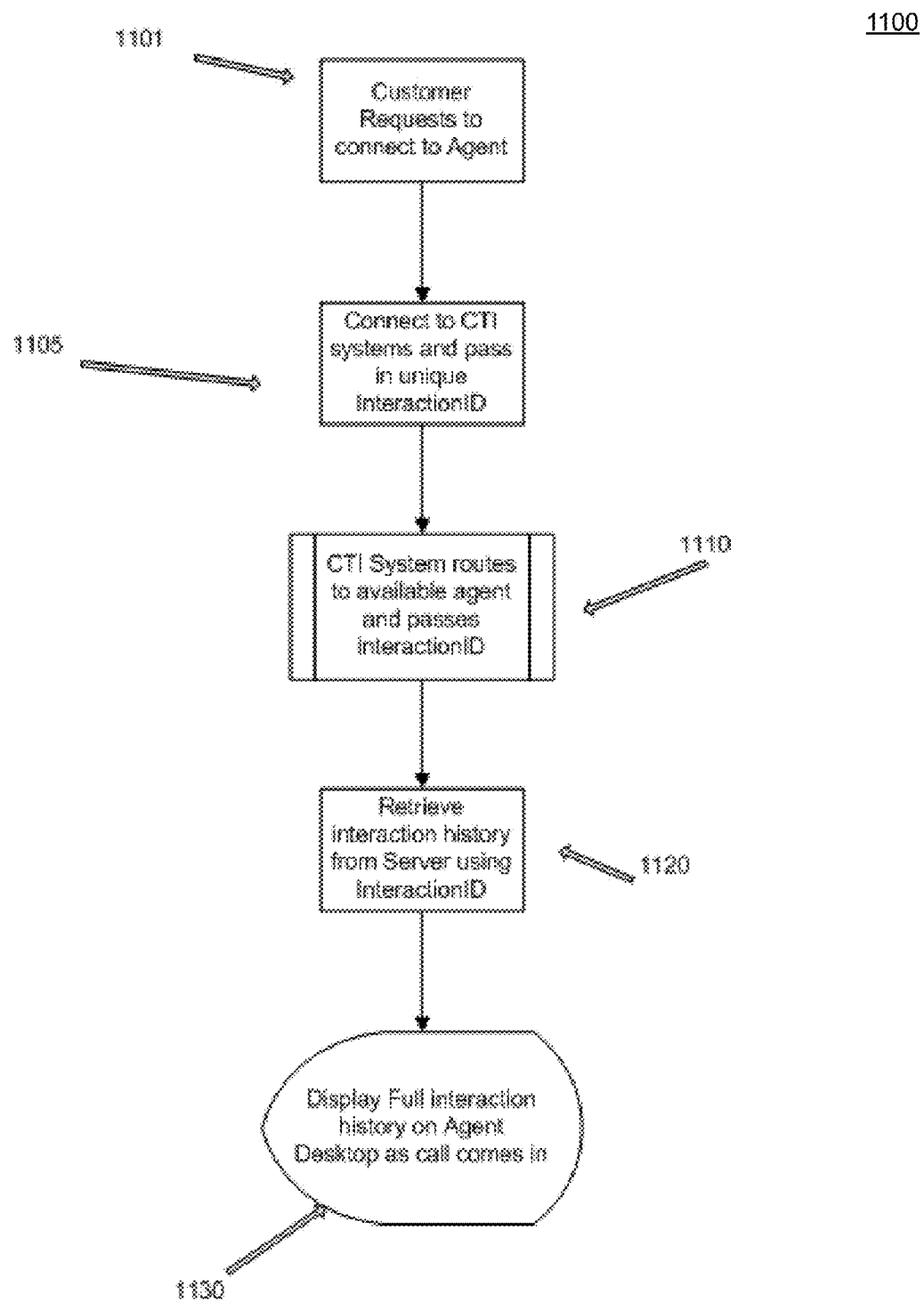
FIG. 11 is a flowchart depicting one embodiment of a method of establishing a voice call between a customer and an agent and communicating to the agent data associated with the user's interaction with the self service application.

FIG. 11 is a flowchart depicting one embodiment of a method 1100 of establishing a call between a user and an agent, and communicating to the agent data associated with the user's interaction with the self service application. In a step 1101, a user or customer requests a call with an agent to receive agent-assisted service. In a step 1105, self service application server 2010 establishes a connection to CTI server 2020 to pass a unique Interaction ID that identifies data associated with the user's interaction with the self service application. Such data may include user data, environmental data, and/or detailed interaction data representing a history of the nodes of the decision tree which were traversed during the interaction of the user with the self service application, and beneficially represents the state, context, data and steps performed during the user's interaction with the self service application. The data associated with the user's interaction with the self service application is maintained and saved on the self service application server 2010 (e.g., within the underlying self service application database 2015) and can be accessed or retrieved by the unique Interaction ID. The specific mechanism used to pass the Interaction ID to CTI server 2020 depends on the specifications and operation of CTI server 2020. The specific implementation mechanism will be readily apparent to one skilled in the art and may include, but is not limited to, web service calls, API calls, REST calls or any integration technology. In a step 1110, CTI routing system 2020 routes the call to an appropriate agent, and passes the unique Interaction ID to the agent via agent computer 2025. The routing mechanism is within the domain of CTI server 2020. However, as disclosed herein, the routing of the call to agent computer 2025 by CTI server 2020 is enhanced to also pass the Interaction ID along with the voice call. This can be commonly performed through using "Attached Data" but can be accomplished by other means, too. Further, this is not meant to be limited to passing in the Interaction ID and could instead be implemented by passing some other key (such as the telephone number of self service access terminal 10, a customer number associated with the user/customer, etc.) and then through a mapping table retrieve the unique Interaction ID. In some embodiments, the CTI routing mechanism may be supplemented by employing additional data known about the user. In a step 1120, an application executing on the agent computer calls an API on self service application server 2010, passing in the unique Interaction ID and retrieving the data associated with the user's interaction with the self service application, as described above. In a step 1130, some or all of this data may be displayed to the agent by agent computer 2025.

Figure 12:
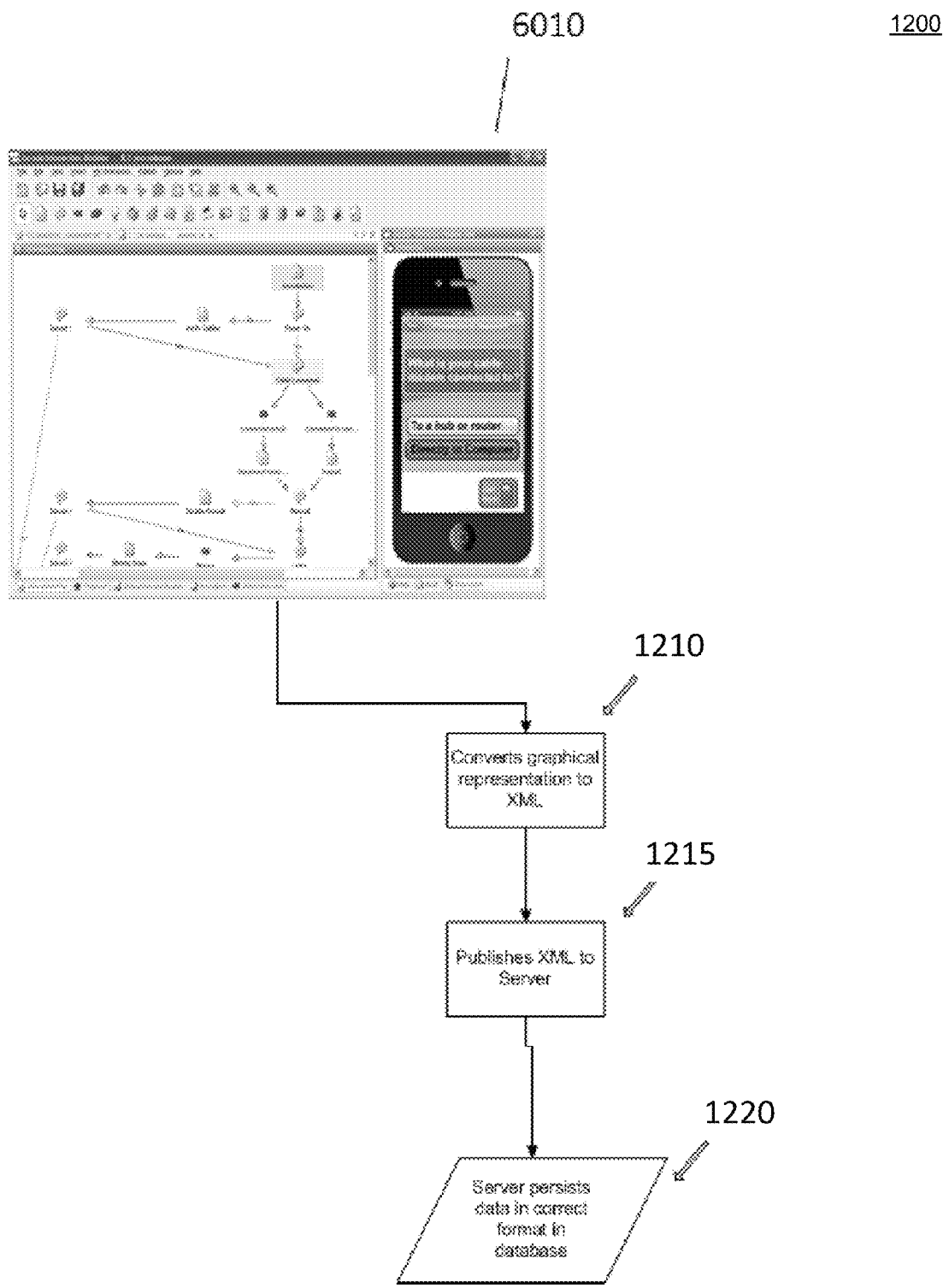
FIG. 12 depicts an embodiment of an operation of graphically creating a script for a self service application and publishing it to a self service application server.

FIG. 12 depicts an embodiment of an operation 1200 of graphically creating a call script for a self service application and publishing it to a self service application server 2010. In a step 1210, when the call script is published, the designer will encapsulate the "graphical script" in an internal meta-data such as XML. Alternate representations other than XML can also be used. In a step 1215, this metadata is then published to the self service application server 2010 over a suitable communication mechanism and API including but not limited to utilizing a Web service call over HTTP. In a step 1220, the self service application server 2010 receives the XML metadata and normalizes and persists the data in the underlying storage mechanism, for example self service application database 2015.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

We claim:

1. A method of supporting an interaction of a user with a self service application, the method comprising:
   (1) presenting to the user, via a display device of a self service access terminal, a user interface for the self service application;
   (2) receiving, via the user interface, a user-supplied input;
   (3) based at least in part on the user-supplied input, navigating a decision tree associated with the self service application to reach a next node of the decision tree, and presenting to the user a user interface screen which is associated with the next node;
   (4) repeating steps (2) and (3) until it is determined, without the user requesting an agent-assisted service session, that the agent-assisted service session should be initiated between the user and a human agent; and
   (5) when it is determined that the agent-assisted service session should be initiated between the user and a human agent, communicating data associated with the interaction with the self service application to an agent computer which displays information to the human agent.

2. The method of claim 1, wherein the self service application, including data representing the decision tree, and the data associated with the interaction with the self service application, are stored in memory of the self service access terminal, and wherein the self service access terminal communicates the data associated with the interaction with the self service application when the next node of the decision tree indicates that an agent-assisted service session should be initiated between the user and the human agent.

3. The method of claim 2, wherein the data associated with the interaction with the self service application includes data representing a history of nodes of the decision tree which were traversed during the interaction with the self service application.

4. The method of claim 3, wherein the data associated with the interaction with the self service application includes user-supplied data supplied by the user via the user interface.

5. The method of claim 4, wherein the data associated with the interaction with the self service application further includes environmental data generated by at least one of the self service access terminal and one or more sensors configured to communicate the environmental data to the self service access terminal.

6. The method of claim 5, wherein the environmental data includes at least one of GPS data, image data, and card swipe data.

7. The method of claim 2, further comprising storing at the self service access terminal metadata for the self service application.

8. The method of claim 2, wherein the self service access terminal is offline from the server and the agent computer during steps (1) through (4).

9. The method of claim 1, further comprising:
   establishing a client/server session between the self service access terminal and a remotely located server;
   communicating the user-supplied input from the self service access terminal to the remotely located server; and
   navigating the decision tree at the remotely located server to reach the next node; and
   communicating from the remotely located server to the self service access terminal data associated with the user interface screen which is associated with the next node.

10. The method of claim 9, wherein the remotely located server communicates the data associated with the interaction with the self service application to the agent computer which displays information to the human agent.

11. The method of claim 1, further comprising establishing a voice call between the user and the human agent.

12. The method of claim 1, wherein the self service access terminal performs steps (1) through (4) without any communication with any external device.

13. The method of claim 1, further comprising: when it is determined that the agent-assisted service session should be initiated between the user and a human agent, providing to the agent computer billing data associated with the user which is received at the server from a line of business (LOB) application.

14. A method of supporting an interaction of a user with a self service application, the method comprising:
(1) at a server, receiving user-supplied input from a self-service access terminal which is located remotely from the server;
(2) based at least in part on the user-supplied input, navigating a decision tree associated with a self service application to reach a next node of the decision tree;
(3) communicating self service data from the server to the remotely located self-service access terminal, where the self service data is associated with the next node and causes the self-service access terminal to display on a display device a user interface screen associated with the next node;
(4) repeating steps (1) through (3) until the server determines, without the use requesting an agent-assisted service session, that the agent-assisted service session should be initiated between the user and a human agent; and
(5) when the server determines that the agent-assisted service session should be initiated between the user and a human agent, communicating data associated with the interaction with the self service application from the server to an agent computer which displays information to the human agent.

15. The method of claim 14, wherein the data associated with the interaction with the self service application includes data representing a history of nodes of the decision tree which were traversed during the interaction with the self service application.

16. The method of claim 14, wherein the data associated with the interaction with the self service application includes user-supplied data supplied by the user via the user interface.

17. The method of claim 14, further comprising; when the server determines that the agent-assisted service session should be initiated between the user and a human agent, providing to the agent computer billing data associated with the user which is received at the server from a line of business (LOB) application.

18. The method of claim 14, wherein communicating data associated with the interaction with the self service application to the agent computer includes communicating to the agent computer environmental gathered from at least one of a sensor and a data gathering device associated with the self service access terminal.

19. The method of claim 18, wherein the environmental data includes at least one of GPS data, image data, and card swipe data.

20. A non-transitory data storage medium having stored thereon instructions for causing a processor to execute a process for supporting an interaction of a user with a self service application, the process comprising:
(1) presenting to a user, via a display device of a self service access terminal, a user interface screen of a user interface of a self service application;
(2) receiving, via the user interface, a user-supplied input pertaining to an interaction with the self service application;
(3) based at least in part on the user-supplied input, navigating a decision tree associated with the self service application to reach a next node of the decision tree, and presenting to the user another user interface screen associated with the next node; and
(4) repeating steps (2) and (3) until it is determined, without the user requesting an agent-assisted service session, that the agent-assisted service session should be initiated between the user and a human agent; and
(5) when it is determined that the agent-assisted service session should be initiated between the user and a human agent, automatically communicating data associated with the interaction with the self service application to an agent computer which displays information to the human agent.

21. The non-transitory data storage medium of claim 20, wherein the process further comprises: when it is determined that the agent-assisted service session should be initiated between the user and a human agent, providing to the agent computer billing data associated with the user which is received at the server from a line of business (LOB) application.

22. The non-transitory data storage medium of claim 20, wherein communicating data associated with the interaction with the self service application to the agent computer includes communicating to the agent computer environmental data gathered from at least one of a sensor and a data gathering device associated with the self service access terminal.

23. The method of claim 22, wherein the environmental data includes at least one of GPS data, image data, and card swipe data.

* * * * *